June 28, 1955 — E. C. CLARK, JR., ET AL — 2,711,782
SPLICING METHODS AND APPARATUS
Filed Sept. 26, 1952 — 2 Sheets-Sheet 1
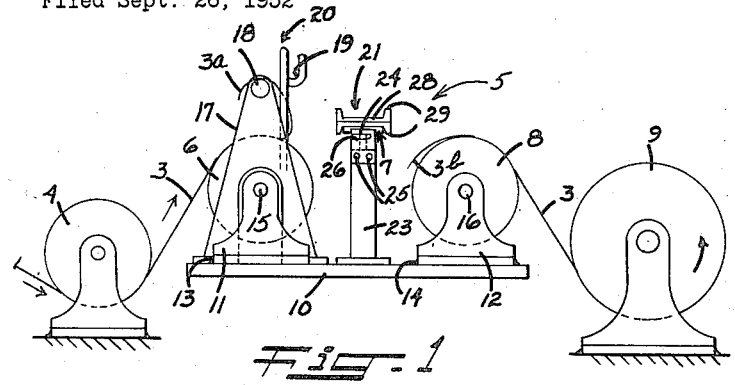
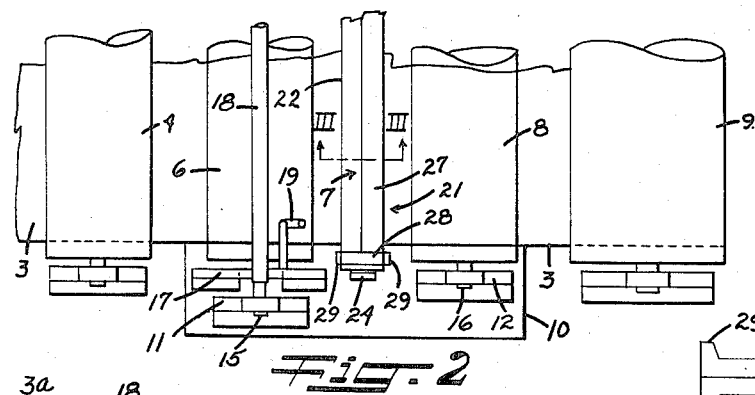
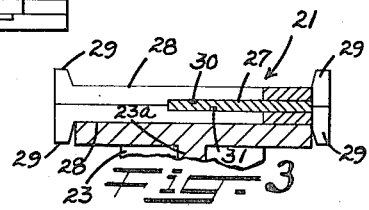
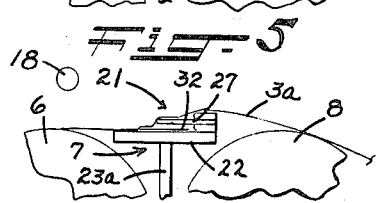
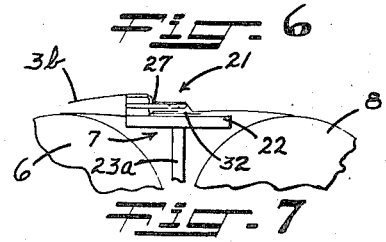
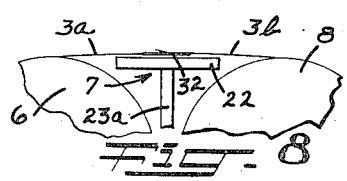
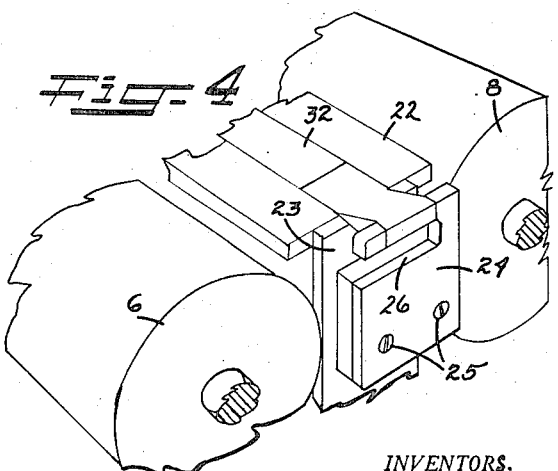
INVENTORS.
EDWARD C. CLARK, JR.
RICHARD D. HULL
BY
Thomas R. O'Malley
ATTORNEY

2,711,782

SPLICING METHODS AND APPARATUS

Edward C. Clark, Jr., and Richard D. Hull, Fredericksburg, Va., assignors to American Viscose Corporation, Philadelphia, Pa., a corporation of Delaware Application September 26, 1952, Serial No. 311,762

16 Claims. (Cl. 154—42.3)

The present invention relates to the manufacture of various types of flexible materials and the like. More particularly the present invention relates to novel and improved methods and apparatus for splicing severed sections of sheets, films, foils, strips, membranes and the like and thereby making the same continuous.

In the manufacture of the various conventional flexible sheet-like materials, it is customary to use a continuous or semicontinuous treating process wherein the sheet or the like is directed through successive processing stations by means of a series of guide rolls or the like. Thus, for example, in the manufacture of cellophane, it is usual practice to direct the cellophane from the extrusion apparatus through the various treating and processing stations of a suitable machine toward a take-up device by means of a series of conventional guide rolls or the like. In so doing, the continuous sheet occasionally becomes ruptured or broken for various reasons and must ordinarily be repaired or spliced preferably, in order to eliminate the necessity of a tedious relacing operation, without removing the sheet from the machine. In the past though various procedures and apparatus have been employed for such purposes, considerable difficulty has been experienced in obtaining an effective wrinkle-free splice having accurately trimmed edges and an exact overlap or butt joint in a ready and convenient manner.

It is a principal object of the present invention to provide methods and apparatus for joining or splicing the severed edges of the flexible sheet-like materials in a novel and improved manner.

Other objects and advantages of the invention will be apparent from the following description. In the drawing which is illustrative of the invention, Figure 1 is a side elevational view of a preferred embodiment of the present invention;

Figure 2 is a fragmentary top view of the apparatus shown in Figure 1;

Figure 3 is an enlarged sectional detail along reference line III—III in Figure 2;

Figures 4 through 8 are diagrammatic views illustrating the various procedural steps followed in the splicing operation of the present invention.

Figure 6A:
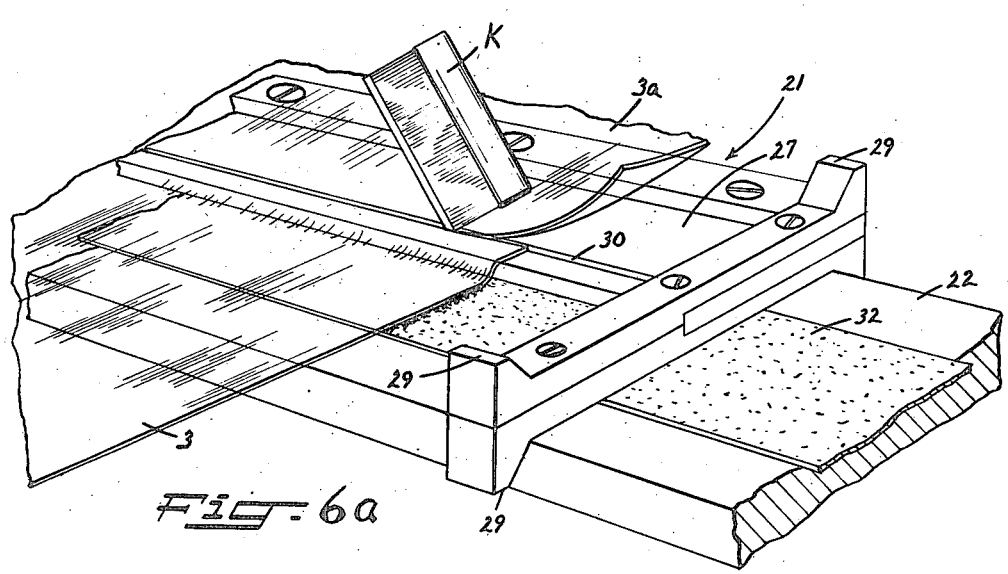
Figure 6a is an enlarged fragmentary perspective showing the structure in the position corresponding to Figure 6.

In general, the improved splicing operation of the present invention for restoring the continuity of a severed sheet or the like includes positioning an adhesive strip or tape preferably but not necessarily at right angles with the longitudinal axis of the sheet, positioning an elongated member along the length of and above the tape so as to leave one edge portion thereof exposed and to cover the remaining edge portion, securing one severed edge of the sheet to the one edge portion of tape, repositioning the elongated member so as to expose the remaining edge portion of the tape, and securing the other severed edge of the sheet thereto. It has been found that a simple yet reliable splice may be made in such a manner.

The structural details of a preferred embodiment of the apparatus which is employed in the present invention are shown in Figures 1 and 2 of the drawing. As illustrated therein, the sheet or film 3 progresses from the processing roll or the like 4 through the splicing apparatus which is generally designated by the numeral 5 and which includes the guide roll 6, the splicing table or platform 7 and the guide roll 8, and toward any suitable guiding, processing, collecting device or the like such as the take-up roll 9. Though the splicing apparatus is shown in the drawing positioned between the processing apparatus and the take-up roll, it is to be understood that the same could be positioned at any point in the processing operation without departing from the spirit or scope of the present invention.

The splicing apparatus 5 is preferably mounted upon and supported by the plate member or the like 10 which is positioned as shown between the processing and take-up rolls 4 and 9 beneath the normal path of the continuously advancing sheet 3. The aligned pairs of bearing members 11 and 12 which are secured to the plate member 10 in any convenient manner such as by welding at 13 and 14 and which extend upwardly therefrom are respectively adapted to rotatably support the guide rolls 6 and 8 on their associated shafts 15 and 16 preferably adjacent opposite ends of the plate member 10. The bracket members 17 which are also secured to the plate member in any convenient manner such as by welding or the like and which extend upwardly therefrom are adapted to support the dowel-like member 18 above and substantially parallel to the upper periphery of the guide roll 6. As will be more apparent hereinafter the dowel-like member is used to maintain the sheet 3 in position about the roll 4 and the other preceding processing rolls not shown on the drawing. The upright splice bar holders or the like 20 with their hooked extremities 19 are secured to and extend upwardly from the bracket members 17 so as to support the splice bar 21 therein while the same is not in use.

Substantially midway between the guide rolls 6 and 8 the horizontally disposed splicing table or platform 7 is secured to and supported on the upright members 23 which are fastened to the supporting plate member 10 in any suitable manner. The tape-holder members 24 which are secured to the opposite extremities of the splicing platform 7 in any suitable manner such as by the studs 25 and which include the notched portion 26 as will be more apparent hereinafter provide a means between which an adhesive strip or the like may be suspended.

The details of a preferred embodiment of the splice bar 21 are shown in Figures 2 and 3 of the drawing. As illustrated therein the elongated straight edge membe 27 rests upon the end plate members 28 so that as will be more apparent hereinafter when the splice bar is positioned on the splicing platform 7 the member 27 covers substantially one half of the underlying platform 7 and is spaced therefrom a predetermined amount. The lugs 29 which are located along the side edges of each of the end plate members 28 are adapted to engage adjacent edge portions of the platform 7 and to thereby properly position and align the splice bar therewith. The longitudinal grooves 30 and 31 which extend along opposite surfaces of the straight edge member 27 are preferably povided to guide any suitable sheet trimming device such as a knife K or the like.

Figure 7A:
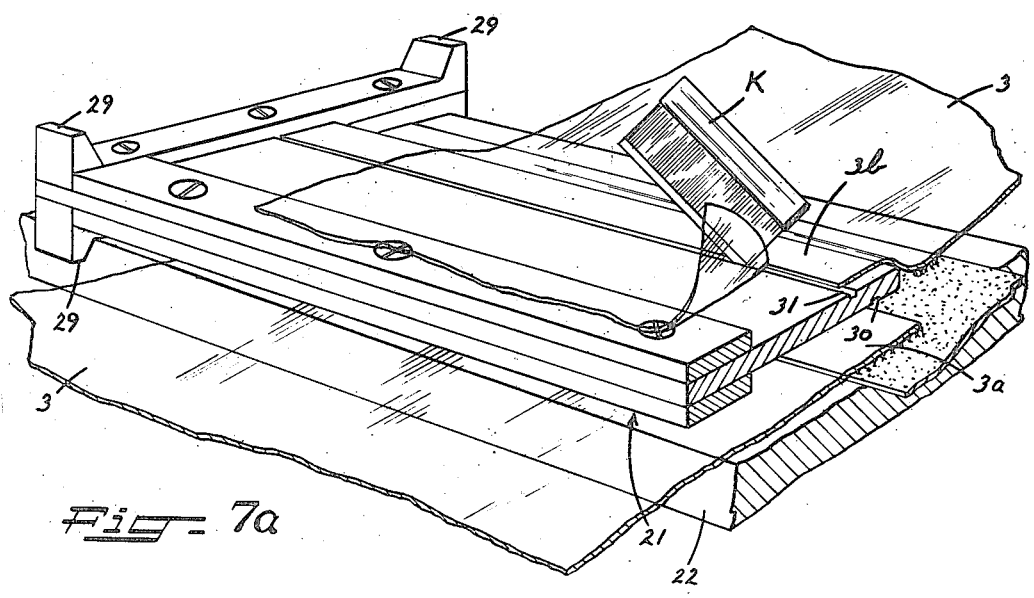
Figure 7a is an enlarged fragmentary perspective showing the structure in the position corresponding to Figure 7.

In carrying out the improved splicing operation in accordance with the present invention as shown in Figures 4–8 of the drawing, a strip of any suitable type of adhesive material or the like 32 is first deposited with its adhesive side up on the splicing platform 7 and is secured at its opposite extremities to the tape holder members 24. As shown in Figure 5 of the drawing, the splice bar 21 is then removed from its holder member 20 and is positioned by means of its end plate guide member 28 on the plate member 22 such that substantially only one half of the adhesive strip 32 is exposed. The end 3a of the sheet is then removed from the dowel member 18 to which it was temporarily supported and/or fastened, is secured as shown in Figure 6a of the drawing to the exposed portion of the adhesive strip, and is trimmed by knife K which is directed along a groove 30. As will be apparent from Figure 6a, this procedure secures the sheet 3 in place on a portion of the tape 32 and permits the edge of the sheet to be trimmed at the correct point so that the entire sheet will be secured to the tape when the plate 23 is reversed. By then inverting the splice bar 21 to the plate member 22 as shown in Figures 7, 7a and 8, the other severed end 3b of the sheet is similarly secured to the other half of the adhesive strip and trimmed with knife K drawn along the longitudinal groove 31 in the splice bar 21.

Though the spliced ends of the sheet 3 are shown in the drawing as overlapping slightly, it is to be understood that a butt or any other suitable joint could be made by properly positioning the grooves 30 and 31 in the splice bar 21 without departing from the spirit or scope of the present invention.

While preferred embodiments of the invention have been disclosed, the description is intended to be illustrative only and it is to be understood that changes and variations may be made without departing from the spirit and scope of the invention as defined by the appended claims.

We claim:

1. A method of splicing sections of a sheet material comprising securing an elongated adhesive strip between two fixed points; shielding one longitudinal edge portion of the strip; securing one section of the sheet material to the remaining portion of the strip; exposing the originally shielded edge portion; and securing another section of the sheet material thereto.

2. A method of splicing severed sections of a sheet material comprising securing an elongated adhesive strip between two fixed points; shielding one longitudinal edge portion of the strip; securing one of the severed sections to the remaining portion of a strip; trimming the extremity of the said one severed section; exposing the originally shielded edge portion of the strip; securing the other severed section thereto; and trimming the extremity of the said other severed sections.

3. A method of splicing severed sections of a sheet material comprising securing an elongated adhesive strip between two fixed points; positioning an elongated member along the length of and above the strip so as to shield one edge portion and expose the remaining portion thereof; securing one of the severed sections to the exposed portion of the strip; repositioning the elongated member so as to expose the originally shielded portion of the strip and securing the other severed section of the sheet material thereto.

4. A method of splicing severed sections of a sheet material comprising securing an elongated adhesive strip between two fixed points; positioning an elongated member along the length of and above the strip so as to shield one portion and expose the remaining portion thereof; securing one of the severed sections to the exposed portion of the strip; trimming the extremity of the said one severed section; repositioning the elongated member so as to expose the originally shielded portion of the strip; securing the other severed edge of the sheet material thereto; and trimming the extremity of the said other severed section.

5. A method of splicing sections of a sheet material comprising positioning an adhesive strip substantially at right angles with the longitudinal axis of the sheet material; positioning the elongated means along the length of and above the strip so as to leave one edge portion thereof exposed and to cover the remaining edge portion; securing one severed section of the sheet material to the exposed portion of the adhesive strip; repositioning the elongated means so as to expose the said remaining portion of the strip; and securing the other severed section of the sheet material thereto.

6. A method of splicing sections of a sheet material comprising positioning an adhesive strip substantially at right angles with the longitudinal axis of the sheet material; positioning elongated means along the length of and above the strip so as to leave one edge portion thereof exposed and to cover the remaining edge portion; securing one severed section of the sheet material to the exposed portion of the strip; trimming the extremity of the said one severed section; repositioning the elongated means so as to expose the remaining portion of the strip; securing the other severed section of the sheet material thereto and trimming the extremity of the said other severed section.

7. An apparatus for splicing severed sections of a sheet material comprising means for securing an elongated adhesive strip between two fixed points; an elongated member; means for positioning the elongated member along the length of and above the strip so as to shield one edge portion and to expose the remaining edge portion thereof; and means for repositioning the elongated member so as to expose the originally shielded portion of the strip.

8. Apparatus for splicing sections of a sheet material which have become severed while being passed through processing apparatus comprising supporting means which extends across the width of the processing apparatus; a splicing bar; means for positioning the splicing bar generally over one side of the upper face of the supporting means; and means for positioning the splicing bar generally over the other side of the upper face of the platform when the bar is inverted.

9. Apparatus for splicing sections of a sheet material which have become severed while being passed through processing apparatus comprising a platform; a splicing bar; means protruding from one face of the bar for positioning and supporting the bar generally over one side of the upper face of the platform; and means protruding from the opposite face of the bar for positioning and supporting the bar generally over the other side of the upper face of the platform when the bar is inverted.

10. Apparatus for splicing sections of a sheet material which have become severed while being passed through processing apparatus comprising a platform; a splicing bar; means protruding from one face of the bar adjacent the extremities thereof for positioning and supporting the bar generally over one side of the upper face of the platform; and means protruding from the opposite face of the bar adjacent the extremities thereof for positioning and supporting the bar generally over the other side of the upper face of the platform when the bar is inverted.

11. Apparatus for splicing sections of a sheet material which have become severed while being handled in continuous processing apparatus comprising a fixed platform which extends across the width of the processing apparatus; a pair of guide rolls positioned on opposite sides of the platform for directing the sheet material toward and away from the platform; tape holding members positioned at opposite extremities of the platform, an elongated straight edge member having a longitudinal groove in each of a pair of opposite surfaces; end plates secured to opposite ends of the straight edge member and adapted to engage the platform so that either of the said opposite surfaces of the straight edge member may be supported on and oriented along the length of the platform, the straight edge member when so oriented and when shifted between one position and its inverted position being adapted to shield opposite longitudinal edge portions of an adhesive strip which extends between the tape holder members.

12. Apparatus for splicing sections of sheet material which have become severed while being handled in continuous processing apparatus comprising supporting means which extends across the width of the processing apparatus; tape holding members positioned at opposite extremities of the supporting means; an elongated straight edge member having a longitudinal groove in each of a pair of opposite surfaces; end plates secured to opposite ends of the straight edge member and adapted to engage the supporting means so that either of the said opposite surfaces of the straight edge members may be supported on and oriented along the length of the platform, the straight edge member when so oriented being adapted to shield opposite longitudinal edge portions of an adhesive strip which extends between the tape holder members by inverting the straight edge member on the supporting means.

13. Apparatus for splicing sections of a sheet material which have become severed while being handled in a continuous processing apparatus comprising supporting means which extends across the width of the processing apparatus; means positioned at opposite ends of the supporting means for extending an adhesive material along the length thereof; an elongated straight edge member; and means adjacent opposite extremities of the straight edge member and integral therewith for engaging the supporting means so that either of a pair of opposite surfaces of the straight edge member may be supported on and oriented along the length of the supporting means, the straight edge member when so oriented being adapted to shield opposite longitudinal edge portions of the adhesive material by inverting the straight edge member on the platform.

14. In apparatus for splicing sections of a sheet material which have become severed while being passed through in a continuous processing machine having a platform which extends across the width thereof; a splicing bar comprising an elongated member and means adjacent opposite extremities of the member and secured thereto for engaging the platform so that either of the opposite faces of the member may be oriented along the length of the platform, the member when so oriented being adapted to shield opposite longitudinal edge portions of the platform by inverting the member.

15. In apparatus for splicing sections of a sheet material which have become severed while being handled in a continuous processing machine having a fixed platform which extends across the width thereof; a splicing bar comprising an elongated straight edge member having a longitudinal groove in each of a pair of opposite surfaces and means adjacent opposite extremities of the straight edge member and integral therewith for engaging the platform such that either of the said opposite surfaces of the straight edge member may be supported on and oriented along the length of the platform, the straight edge member when so oriented being adapted to shield opposite longitudinal portions of an adhesive material positioned on the platform by inverting the straight edge member.

16. In apparatus for splicing sections of a sheet material which have become severed while being handled in a continuous processing machine having a fixed platform which extends across the width thereof; a splicing bar comprising an elongated straight edge member having a longitudinal groove in each of a pair of opposite surfaces; and end plate members which are secured to opposite extremities of the straight edge member which are adapted to engage the platform such that either of the said opposite surfaces of the straight edge member may be supported on and oriented along the length of the platform, the straight edge member when so oriented being adapted to shield opposite longitudinal edge portions of an adhesive material which is positioned on the platform by inverting the straight edge member.

References Cited in the file of this patent

UNITED STATES PATENTS

| | | |
|---|---|---|
| 2,446,576 | De Vry | Aug. 10, 1948 |
| 2,606,136 | Garrett et al. | Aug. 5, 1952 |